United States Patent
Fjellstad et al.

(10) Patent No.: US 8,313,032 B2
(45) Date of Patent: Nov. 20, 2012

(54) METHOD AND APPARATUS FOR TIME AND DATE STAMPING OF IMAGE FILES

(75) Inventors: Chris J. Fjellstad, Smithtown, NY (US); James P. Greenrose, Manorvllle, NY (US); Artur K. Kasperek, South Setauket, NY (US); Thomas E. Lackemann, Sayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 352 days.

(21) Appl. No.: 12/619,917

(22) Filed: Nov. 17, 2009

(65) Prior Publication Data

US 2011/0114730 A1   May 19, 2011

(51) Int. Cl.
  *G06K 7/10*  (2006.01)
(52) U.S. Cl. .................. 235/462.25; 235/375; 235/377; 235/379
(58) Field of Classification Search ............. 235/462.25, 235/375, 377, 379; 705/302
See application file for complete search history.

(56) References Cited

U.S. PATENT DOCUMENTS

| | | | |
|---|---|---|---|
| 6,325,283 B1* | 12/2001 | Chu et al. | 235/375 |
| 2004/0035922 A1* | 2/2004 | Cameron | 235/377 |
| 2008/0121689 A1* | 5/2008 | Good et al. | 235/375 |
| 2008/0142599 A1* | 6/2008 | Benillouche et al. | 235/462.41 |
| 2008/0292300 A1* | 11/2008 | van der Veen et al. | 396/311 |
| 2009/0037199 A1* | 2/2009 | Testardi | 705/1 |
| 2010/0088439 A1* | 4/2010 | Ang et al. | 710/105 |

* cited by examiner

Primary Examiner — Allyson Trail
(74) Attorney, Agent, or Firm — Nong-Qiang Fan

(57) ABSTRACT

A method and apparatus for time stamping an image file generated by an imaging based barcode reader. The method includes initializing a current time and date on the barcode reader and tracking the current time and date using an oscillator of the barcode reader. The date and time value are set whenever the barcode reader is powered on. The method further includes capturing an image of a target object using the imaging based barcode reader and time stamping the captured image using the time tracked by the oscillator. The time stamped image is then transmitted to a host device.

12 Claims, 3 Drawing Sheets

METHOD AND APPARATUS FOR TIME AND DATE STAMPING OF IMAGE FILES

FIELD OF THE DISCLOSURE

The present disclosure relates generally to an imaging based barcode reader and more particularly to time and date stamping of image files generated by an imaging based barcode reader.

BACKGROUND

Various time stamping methods are adopted for dating records such as image files produced by digital devices such as computers or digital cameras. A timestamp is a sequence of characters, denoting the date and/or time at which a particular file was created or modified and thereby aid in searching, sorting, filtering, evidence tracking, etc., of the files. The timestamp data is obtained by keeping track of a current time and date value using an embedded real-time clock (RTC) present in the digital device. The timestamp data can then be embedded into the image produced by the digital device.

However, some barcode scanners do not have an embedded RTC and adding a RTC to the barcode scanner can increase the cost of the scanner. In such cases, it will be difficult to have time stamping done on an image or file generated by the scanner by using the existing methods.

Accordingly, there is a need for a method and apparatus for time and date stamping of image files.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
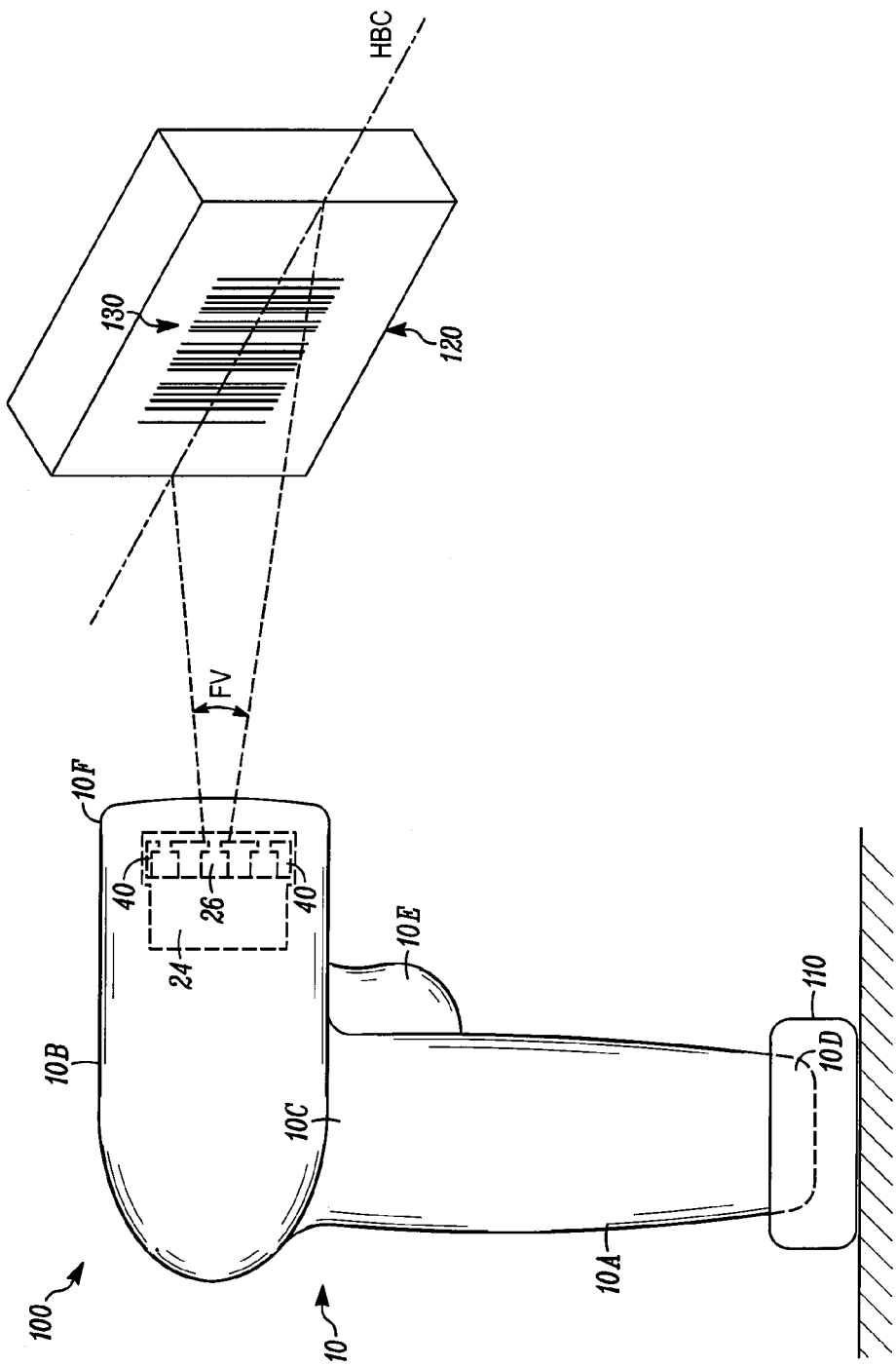
FIG. 1 is a system diagram of barcode system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention relates to a method and apparatus for time stamping an image file generated by an imaging based barcode reader. The method includes initializing a current time and date on the barcode reader and tracking the current time and date using an oscillator of the barcode reader. The date and time value are set whenever the barcode reader is powered on. The method further includes capturing an image of a target object using the imaging based barcode reader and time stamping the captured image using the time tracked by the oscillator. The time stamped image is then transmitted to a host device. Advantages of the various embodiments include: time stamping on image files without using a real time clock (RTC), thereby reducing the cost associated with adding a separate RTC IC. Those skilled in the art will realize that the above recognized advantages and other advantages described herein are merely illustrative and are not meant to be a complete rendering of all of the advantages of the various embodiments.

Referring now to figures, FIG. 1 is a system diagram of a barcode system 100 in accordance with some embodiments. The barcode system 100 can include such as, but not limited to an imaging based barcode system. FIG. 1, system 100 shows a hand-held barcode reader 10 acting upon a target object 120 having a barcode 130. The barcode 130 can include such as but not limited to the popular barcode symbologies such as: Uniform Product Code (UPC), typically used in retail stores sales; Code 39, primarily used in inventory tracking; Postnet, which is used for encoding zip codes for U.S. mail; and PDF 417 barcodes, which is used in driving licenses. Barcodes may be one dimensional (1D), i.e., a single row of graphical indicia such as the UPC barcode or two dimensional (2D), i.e., multiple rows of graphical indicia comprising a single barcode such as the PDF 417 barcode.

Returning back to the description of FIG. 1, the hand-held barcode reader 10 includes a gripping portion 10A adapted to be grasped by an operator's hand and a forward or scanning head portion 10B extending from an upper part 10C of the gripping portion 10A. A lower part 10D of the gripping portion 10A is adapted to be received in a docking station 110 positioned on a substrate such as a table or sales counter. The barcode reader 10 includes a front wall region 10F on the scanning head portion 10B. The scanning head portion 10B includes an imaging camera assembly 24 and an illumination system 40. The imaging camera assembly 24 includes a housing 26 supporting focusing optics including one or more imaging lens and a photo sensor or pixel array for capturing the image of the barcode 130 through a transparent window (not shown) present on the front wall 10F. The scanning head portion 10B can also include an input device such as a keypad unit (not shown) for entering a current time and date onto the barcode reader 10. The barcode reader 10 also includes a trigger 10E. Imaging and decoding of the target barcode 130 is instituted by depressing the trigger 10E.

The barcode reader 10 of the present invention is adapted to be used in both a hand-held mode and a fixed position mode. In the fixed position mode, the reader 10 is received in the docking station 110 and a target object 120 having a target barcode 130 is brought within the field of view (FV) of imaging camera assembly 24 in order to have the barcode reader 10 read the target barcode 130. The imaging camera assembly 24 is typically always on or operational in the fixed position mode to image and decode any target barcode 130 presented to the barcode reader 10 within the field of view (FV). The docking station 110 is plugged into an AC power source and provides regulated DC power to the barcode reader 10. Thus, when the barcode reader 10 is in the docking station 110 power is available to keep the imaging camera assembly 24 on continuously. In the hand-held mode, the reader 10 is removed from the docking station 110 so the reader 10 can be carried by an operator and positioned such that the target barcode 130 is within the field of view (FV) of the imaging camera assembly 24. In the hand-held mode, imaging and decoding of the target barcode 130 is instituted by the operator depressing the trigger 10E.

For the purpose of this description, a hand-held imaging based barcode system will be discussed. However, it will be apparent to one of ordinary skill in the art that the techniques and devices described herein can be practiced advantageously with stationary or bi-optic imaging systems.

Figure 2:
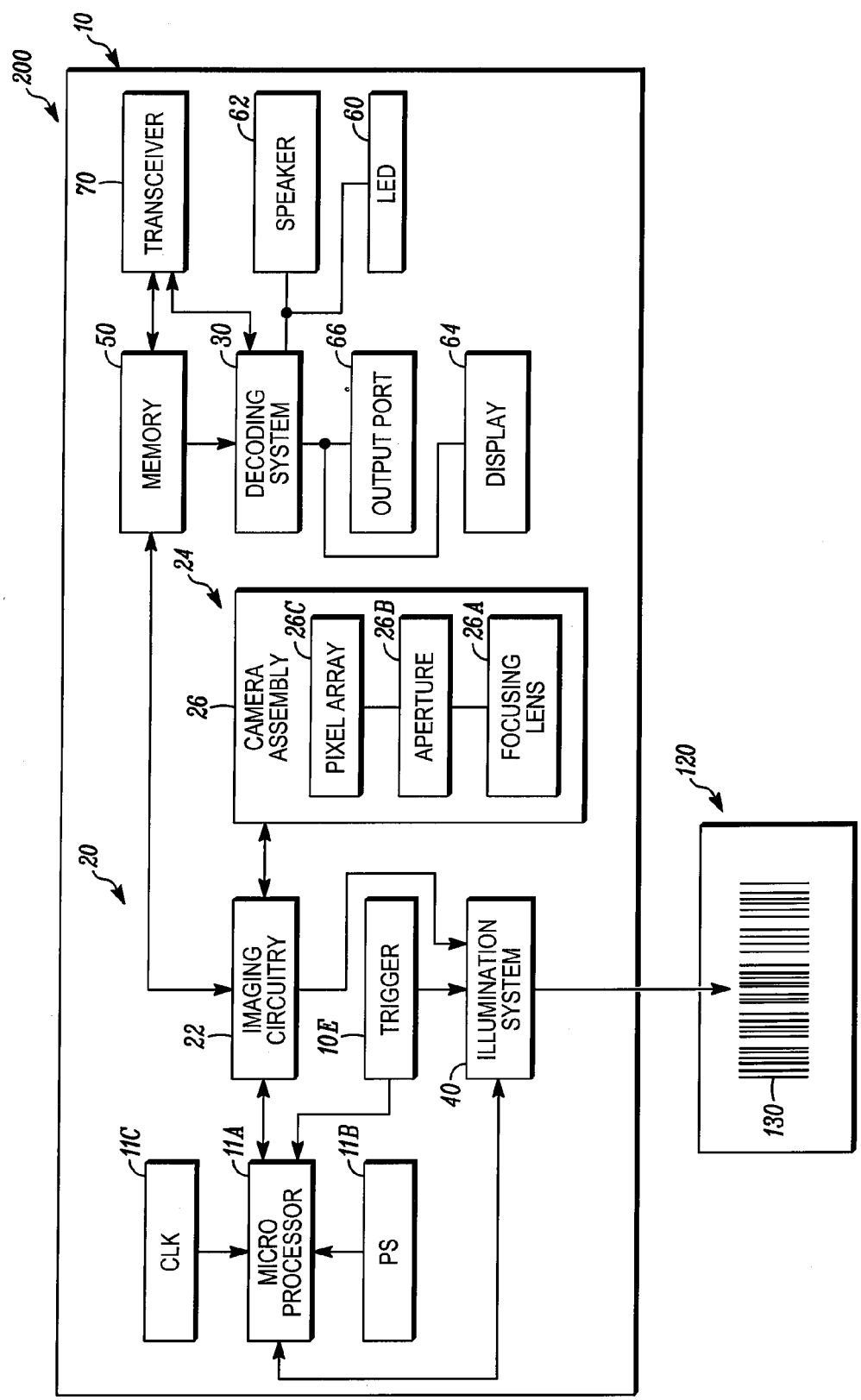
FIG. 2 is a block diagram of a barcode reader in accordance with some embodiments.

FIG. 2 is a block diagram of an imaging based barcode reader 10 in accordance with some embodiments. The block diagram 200 illustrates an internal circuitry of the barcode reader 10 in accordance with some embodiments. The imaging based barcode reader 10 includes an imaging system 20 and a decoding system 30. The imaging system 20 is adapted to capture image frames of graphical indicia such as a barcode 130 present in a field of view (FV) of the imaging system 20 and the decoding system 30 is adapted to decode encoded indicia within a captured image frame. The imaging system 20 and the decoding system 30 are part of the barcode system circuitry. The circuitry also includes a microprocessor 11A, a power supply 11B, and an internal oscillator or clock 11C. The microprocessor 11A is used to control the operations of the imaging and decoding systems 20 and 30, respectively. The power supply 11B is used for supplying power to the microprocessor 11A and also to other hardware units within the barcode reader 10. The clock 11C is used for supplying timing information for the operation of the microprocessor 11A. In one embodiment the clock 11C can also be used to track a current time and date and thereby aid in time stamping on an image captured by the imaging camera assembly 24.

Returning back to the description of FIG. 2, the imaging system 20 includes the imaging camera assembly 24 and an associated imaging circuitry 22. The imaging camera assembly 24 includes a housing 26 supporting focusing optics including one or more imaging or focusing lens 26A, an aperture 26B, and a photo sensor or pixel array 26C. The focusing lens 26A focuses light reflected and scattered from the target barcode 130 through an aperture 26B onto the pixel/photo sensor array 26C. Thus, the imaging lens 26A focuses an image of the target barcode 130 (assuming it is within the FV) onto the array of pixels comprising the pixel array 26C, thereby enabling the pixel array 26C to capture an image of a target object 120 within a FV of the imaging camera assembly 24 during an exposure period. The FV of the imaging camera assembly 24 includes both a horizontal (shown in FIG. 1) and a vertical (not shown) field of view. The FV of the imaging camera assembly 24 is a function of both the configuration of the sensor array 26C and the optical characteristics of the imaging lens 26A and the distance and orientation between the array 26C and the imaging lens 26A.

Further, the imaging system 20 includes, but not limited to, a linear or one dimensional imaging system and the photo sensor array 26C includes, but not limited to, a linear or 1D sensor array. The sensor array 26C includes such as but not limited to a charged coupled device (CCD), a complementary metal oxide semiconductor (CMOS), or other imaging pixel array, operating under the control of the imaging circuitry 22. The number of pixels in the row typically would be 512, 1024, 2048 or 4096 pixels. The typical size of a pixel in the pixel array would be on the order of 7 microns in horizontal width× 120 microns in vertical height. The linear sensor array 26C is primarily adapted to image 1D barcodes, such as, a UPC barcode as shown in FIG. 1 which extends along a horizontal axis HBC and includes one row of indicia, an array of dark bars and white spaces. However, one of skill in the art would recognize that the present invention is also applicable to imaging systems utilizing a 2D photo sensor array to image 2D barcodes, postal codes, signatures, etc.

Referring back to FIG. 2, the barcode reader 10 includes an illumination system 40 to illuminate the target barcode 130. The illumination system 40 directs an illumination pattern towards the target barcode 130. The illumination from the illumination system 40 is reflected by the target barcode 130. The reflected light then passes through the imaging lens 26A and is focused onto the sensor array 26C of the imaging system 20. The pixel array 26C generates an analog electrical signal by reading out some or all of the pixels of the pixel array 26C after an exposure period. In some sensors, particularly CMOS sensors, all pixels of the pixel array 26C are not exposed at the same time, thus, reading out of some pixels may coincide in time with an exposure period for some other pixels. The analog signal from the pixel array 26C is amplified by a gain factor of the imaging circuitry 22 and then digitized by the A/D converter of the imaging circuitry 22 to generate a digitized signal. The digitized signal includes a sequence of digital gray scale values typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness). The digitized gray scale values are stored in a memory 50. The digitized gray scale values correspond to an image frame which is representative of the image projected by the imaging lens 26A onto the pixel array 26C during an exposure period. A timestamp can be applied on the image frame stored in the memory 50 and can be transmitted to a host device (not shown) through a transceiver 70. The timestamp information can be obtained from the internal clock 11C of the barcode reader 10. The transceiver 70 can be a wired or wireless transceiver. Otherwise, the digitized gray scale values can be sent to the decoding system 30 to obtain the data represented by the barcode 130.

The decoding system 30 operates on the digitized gray scale values of the image frame and attempts to decode any decodable image within the image frame. If the decoding is successful, decoded data, representative of the data/information coded in the barcode 130 is then output via a data output port 66 and/or displayed to the user of the barcode reader 10 via a display 64. Upon achieving a good "read" of the barcode 130, that is, the barcode 130 was successfully imaged and decoded, a speaker 62 and/or an indicator LED 60 is activated by the barcode circuitry to indicate to the user that the target barcode 130 has been successfully imaged and decoded. If decoding is unsuccessful, a successive image frame is selected and the decoding process is repeated until a successful decode is achieved.

The imaging and decoding systems 20, 30 of the present invention may be embodied in hardware, software, electrical circuitry, firmware embedded within the microprocessor 11A or the imaging camera assembly 24, on a flash read only memory (ROM), on an application specific integrated circuit (ASIC), or any combination thereof.

Figure 3:
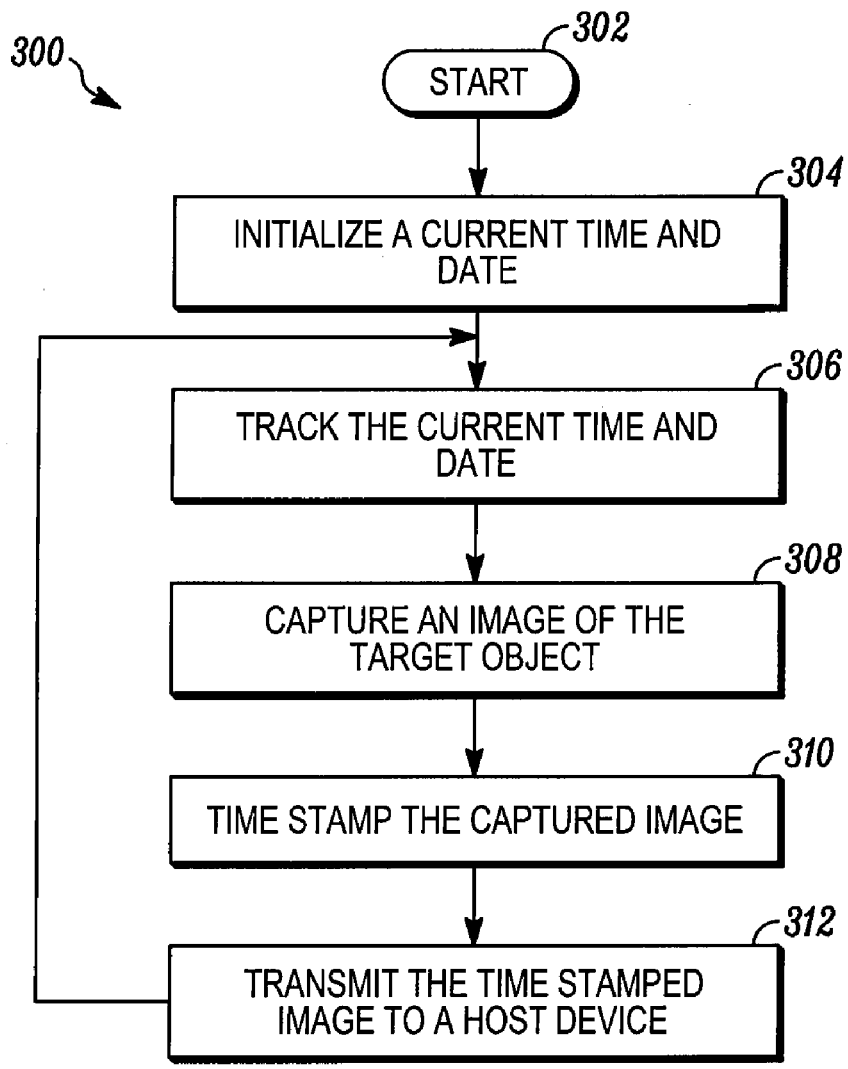
FIG. 3 is a flowchart of a method for time and date stamping of an image file in accordance with some embodiments.

FIG. 3 is a flowchart of a method for time and date stamping of an image file in accordance with some embodiments. The method 300 describes time and date stamping on an image file captured by the imaging based barcode reader 10. Upon powering on 302 the barcode reader 10, a current time and date value is initialized 304. This initialization 304 is required whenever the barcode reader 10 is turned on or powered on. The initialization 304 can be done by manually entering a current time and date into the barcode reader 10 using an input device such as but not limited to a keypad or a touch screen display. After initializing 304 the current time and date value, the method 300 proceeds with tracking 306 the current time and date value using the internal clock 11C of the barcode reader 10. In one example, the digital scanners can use an internally derived 3.25 MHz clock. Once the tracking 306 function is enabled the barcode reader 10 continues with capturing 308 an image of the target object 120. The target object 120 can include a barcode 130 or any other data such as an image, signature, photo, etc. The captured image can be stored in various file formats such as but not limited to joint photographic experts group (JPEG) file format and tagged image file format (TIFF).

Returning back to the method 300, after capturing 308 an image, time stamping 310 can be done on the captured image using the date and time value tracked 306 by the internal clock 11C of the barcode reader 10. The time stamping 310 includes stamping some information on the captured image. The information can include date and time information, camera settings information, and copyright information. The date and time information includes the date and the exact time at which a particular image was captured. The camera setting information includes static information such as but not limited to camera model and make, and information that varies with each image such as orientation of the camera (rotation), aperture opening, shutter speed, focal length, metering mode, etc. The copyright information includes the information regarding the owner of the imaging device. All the above time stamping information can be included in a file. The file can be stored in any format such as but not limited to exchangeable image file format (EXIF). Also, the time stamping information stored in EXIF file format can be easily used to timestamp a .JPEG or .TIFF file.

Referring back to method 300, after time stamping 310 the captured image, the time stamped image can be transmitted 312 to a host device such as a personal computer, laptop, mobile unit, etc. in order to store the time stamped image in a database. The transmission path between the barcode reader 10 and the host device (not shown) can be wired or wireless. The timestamp on the stored images makes searching, filtering, or tracking of the images easy. After transmitting 312 the time stamped image to the host device the method 300 continue tracking 306 a current time and date. The method 300 is iterative and continues until the barcode reader 10 is turned off.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for time stamping an image file generated by an imaging based barcode reader, the method comprising:
   a microprocessor;
   initializing a current time and date on the imaging based barcode reader after powering on the barcode reader;
   tracking the current time and date based upon the frequency of an oscillator of the imaging based barcode reader, and wherein the oscillator is operationally coupled to the microprocessor to supplying timing information for the operation of the microprocessor;
   capturing an image of a barcode on a target object using the imaging based barcode reader;
   time stamping the captured image of the barcode using the tracking, wherein said time stamping comprises storing in an image file having therein both the captured image of the barcode and the current time obtained from said tracking step; and
   wherein initializing a current time and date includes setting a current time and date value upon powering on the imaging based barcode reader.

2. The method of claim 1 further comprising transmitting the time stamped image to a host device.

3. The method of claim 1, wherein the time stamping includes stamping on the image at least one of date and time information, camera settings information, and copyright information.

4. The method of claim 3, wherein the image file comprises a file with an exchangeable image file format (EXIF).

5. The method of claim 1, wherein the image file comprises a file with at least one of joint photographic experts group (JPEG) file format and tagged image file format (TIFF).

6. An imaging based barcode reader for time stamping an image file, the imaging based barcode reader comprising:
   a scanning arrangement for capturing an image of a barcode on a target object;
   an illumination system for generating an illumination pattern directed towards the target object;
   an input device for initializing a current time and date on the barcode reader; and
   a processor coupled to the scanning arrangement and the illumination system, wherein the processor is configured to
      receive a current time and date value setting after powering on the imaging based barcode reader, and
      track the current time and date based upon the frequency of an oscillator of the imaging based barcode reader and time stamp the captured image of the barcode using the tracking, and wherein the oscillator is operationally coupled to the microprocessor to supplying timing information for the operation of the processor,
      store in an image file having therein both the captured image of the barcode and the current time obtained from said tracking step; and
   wherein the processor is configured to receive a current time and date value setting upon powering on the imaging based barcode reader.

7. The imaging based barcode reader of claim 6 further comprising a transceiver for transmitting the time stamped image to a host device.

8. The imaging based barcode reader of claim 6, wherein the processor is configured to timestamp at least one of date and time information, camera settings information, and copyright information, on the captured image.

9. The imaging based barcode reader of claim 8, wherein the image file comprises a file with an exchangeable image file format (EXIF).

10. The imaging based barcode reader of claim 6, wherein the image file comprises a file with at least one of joint photographic experts group (JPEG) file format and tagged image file format (TIFF).

11. An imaging based barcode system for time stamping an image file, the system comprising:
    a microprocessor;
    means for capturing an image of a barcode on a target object;
    means for generating an illumination pattern directed towards the target object;
    means for initializing a current time and date on the imaging based barcode system after powering on the barcode system; and
    means for tracking the current time and date based upon the frequency of an oscillator of the imaging based barcode system and time stamping the captured image of the barcode using the tracking, and wherein the oscillator is operationally coupled to the microprocessor to supplying timing information for the operation of the processor; and
    means for storing in an image file having therein both the captured image of the barcode and the current time obtained from said means for tracking; and
    wherein the means for initializing comprises means for setting a current time and date value upon powering on the imaging based barcode reader.

12. The system of claim 11 further comprising a means for transmitting the time stamped image to a host device.

* * * * *